United States Patent
Navon et al.

(10) Patent No.: US 11,706,144 B2
(45) Date of Patent: Jul. 18, 2023

(54) MARKING PACKETS BASED ON EGRESS RATE TO INDICATE CONGESTION

(71) Applicant: Marvell Israel (M.I.S.L) Ltd., Yokneam (IL)

(72) Inventors: Gideon Navon, Tel-Aviv (IL); Rami Zemach, Givat Shapira (IL); Yaron Kittner, Pardes Hanna-Karkur (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 131 days.

(21) Appl. No.: 17/313,519

(22) Filed: May 6, 2021

(65) Prior Publication Data
US 2021/0352016 A1 Nov. 11, 2021

Related U.S. Application Data

(60) Provisional application No. 63/020,685, filed on May 6, 2020.

(51) Int. Cl.
*H04L 47/12* (2022.01)
*H04L 47/11* (2022.01)
*H04L 47/62* (2022.01)

(52) U.S. Cl.
CPC .............. *H04L 47/12* (2013.01); *H04L 47/11* (2013.01); *H04L 47/62* (2013.01)

(58) Field of Classification Search
CPC ........... H04L 47/12; H04L 47/11; H04L 47/62
See application file for complete search history.

(56) References Cited

U.S. PATENT DOCUMENTS

| 8,520,522 B1 | 8/2013 | Goldman et al. |
| 9,246,813 B2 | 1/2016 | Kim et al. |

(Continued)

FOREIGN PATENT DOCUMENTS

WO WO-2010/056158 A1 5/2010

OTHER PUBLICATIONS

International Search Report and Written Opinion in International Patent Application No. PCT/IB2021/053858, dated Aug. 9, 2021 (14 pages).

(Continued)

*Primary Examiner* — Chi H Pham
*Assistant Examiner* — Weibin Huang (57) ABSTRACT

A network device includes a rate measurement circuit that is configured to measure respective egress rates at which respective data is being transmitted via respective ports associated with the network device. A marking ratio determination circuit is configured to select respective marking ratios based on respective measured egress rates, the marking ratios for marking packets to be transmitted via the respective ports to indicate respective levels of congestion corresponding to the respective ports. Different marking ratios correspond to different measured egress rates. A packet editor circuit is configured to mark selected packets to be transmitted via respective ports according to the respective selected marking ratios. The respective selected marking ratios indicate to other communication devices that respective network paths via which the selected packets travelled experienced congestion, and the respective marking ratios indicate respective levels of congestion.

19 Claims, 6 Drawing Sheets

(56) References Cited

U.S. PATENT DOCUMENTS

| | | | |
|---|---|---|---|
| 9,369,372 B1* | 6/2016 | Kugel | H04L 45/02 |
| 10,708,189 B1 | 7/2020 | Agrawal et al. | |
| 2006/0092836 A1* | 5/2006 | Kwan | H04L 47/12 |
| | | | 370/389 |
| 2009/0213823 A1* | 8/2009 | Liu | H04W 24/02 |
| | | | 370/338 |
| 2013/0055373 A1 | 2/2013 | Beacham et al. | |
| 2013/0258853 A1 | 10/2013 | Sindhu et al. | |
| 2013/0329577 A1 | 12/2013 | Suzuki et al. | |
| 2015/0109928 A1 | 4/2015 | Yang et al. | |
| 2015/0131446 A1* | 5/2015 | Kwan | H04L 47/6215 |
| | | | 370/235 |
| 2017/0289048 A1* | 10/2017 | Chao | H04L 43/0864 |
| 2019/0253364 A1* | 8/2019 | Li | H04L 47/2441 |
| 2020/0136982 A1 | 4/2020 | Mayer-Wolf et al. | |
| 2020/0236057 A1* | 7/2020 | Li | H04L 47/2483 |

OTHER PUBLICATIONS

Majidi Akbar et al: "Priority Policy in Multi-Queue Data Center Networks via per-Port ECN Marking", 2020 14th International Conference on Ubiquitous Information Management and Communication (IMCOM), IEEE, Jan. 3, 2020 (Jan. 3, 2020), pp. 1-8.

Alizadeh et al., "Less is more: trading a little bandwidth for ultra-low latency in the data center," NSDI'12: Proceedings of the 9th USENIX conference on Networked Systems Design and Implementation, USENIX, 19 pages (Apr. 2012).

\* cited by examiner

MARKING PACKETS BASED ON EGRESS RATE TO INDICATE CONGESTION

CROSS REFERENCES TO RELATED APPLICATIONS

This application claims the benefit of U.S. Provisional Patent App. No. 63/020,685, entitled "Rate-Based Explicit Congestion Notification (ECN) Marking," filed on May 6, 2020, the disclosure of which is hereby expressly incorporated herein by reference in its entirety.

FIELD OF TECHNOLOGY

The present disclosure relates generally to communication networks, and more particularly to marking packets to indicate congestion.

BACKGROUND

Conventionally, network devices in a communication network (e.g., switches, routers, bridges, etc.) respond to congestion by dropping packets. Explicit Congestion Notification (ECN) (an extension to the Internet Protocol (IP) (Network Working Group Request for Comments (RFC) 3168, updated by RFC 4301 and RFC 6040)) is a mechanism for providing end-to-end notification of network congestion and is intended to mitigate network congestion before dropping packets becomes necessary. With ECN, when a router or switch detects congestion, the router/switch begins marking packets in IP headers before transmitting the packets, rather than dropping the packets. The marking of the packets signals to an endpoint device that the packets encountered congestion while travelling to the endpoint device. In response to the marked packets, the endpoint device may inform a source device to reduce its transmission rate in an attempt to mitigate the congestion.

In a conventional router/switch that employs ECN marking, the router/switch determines that congestion is occurring by detecting when a buffer reaches a first threshold fill level, and in response begins ECN marking of packets. If the congestion is not mitigated and the fill level of the buffer reaches a higher second threshold, the router switch begins dropping packets to prevent buffer overflow. Thus, for long round trip times between the endpoint device and the source device, a delay between when the marking of packets begins and when the source device begins reducing its transmission rate may result in the fill level of the buffer continuing to increase before the source device reduces its transmission rate, resulting in increased delay and, if the packet buffer size is not sufficiently large, packet dropping. As a result, a size of the buffer may need to be increased sufficiently in order to allow the buffer to absorb the congestion until the congestion control can take effect, thus increasing the cost of the network device.

SUMMARY

In an embodiment, a network device comprises: a forwarding database; a forwarding engine coupled to the forwarding database, the forwarding engine being configured to forward packets to ports for transmission, the ports being determined by the forwarding engine using forwarding information residing in the forwarding database; a rate measurement circuit that is configured to measure respective egress rates at which respective data is being transmitted via respective ports; a marking ratio determination circuit configured to select respective marking ratios based on respective measured egress rates, the marking ratios for marking packets to be transmitted via the respective ports to indicate respective levels of congestion corresponding to the respective ports, wherein different marking ratios correspond to different measured egress rates; and a packet editor circuit configured to mark selected packets to be transmitted via respective ports according to the respective selected marking ratios, wherein the respective selected marking ratios indicate to other communication devices that respective network paths via which the selected packets travelled experienced congestion, and the respective marking ratios indicate respective levels of congestion.

In another embodiment, a method for signaling congestion in a network includes: measuring, at a network device, an egress rate at which data is being transmitted via a port of the network device; selecting, at the network device, a marking ratio for marking packets to be transmitted via the port based on the measured egress rate to indicate a level of congestion corresponding to the port, wherein different marking ratios correspond to different measured egress rates; marking, at the network device, selected packets according to the selected marking ratio; and after marking the selected packets that are to be transmitted via the port, transmitting the selected packets via the port, wherein the marking of the selected packets signals that a network path via which the selected packets travelled experienced congestion and the marking ratio indicates a level of the congestion.

DETAILED DESCRIPTION

In various embodiments described below, a network device, such as a router, a switch, a bridge, etc., measures a utilization of a network link ("measured link utilization"), and uses the measured link utilization to determine when congestion control techniques, such as ECN marking, should be employed. By using the measured link utilization to determine when congestion control should be employed, as opposed to employing congestion control in response to a fill level of a buffer or queue exceeding a threshold, congestion control techniques can be instituted before an onset of congestion, which reduces latency and which may also reduce packet dropping while not requiring large increases in buffer/queue sizes, at least in some embodiments. In some embodiments, a rate at which data is egressed from a port of the network device that is coupled to a network link is an example of a measure of a utilization of the network link. In some embodiments, a rate at which data corresponding to a queue coupled to the port is egressed to the port for transmission via the network link is a measure of a utilization of the network link, for example when a respective share of the capacity of the network link corresponding to the queue is known.

In at least some embodiments, using measured link utilization to determine when congestion control techniques, such as ECN marking, should be employed, results in commencing the use of such congestion control techniques before such congestion control techniques would be commenced in a conventional network device that relies merely on detecting whether a fill level of a buffer or queue exceeds a threshold. Thus, if a conventional sense of "congestion" is defined as when a fill level of a buffer or queue exceeds a threshold, embodiments described herein commence using congestion control techniques, such as ECN marking, before such "congestion" is encountered, at least in some situations.

Figure 1:
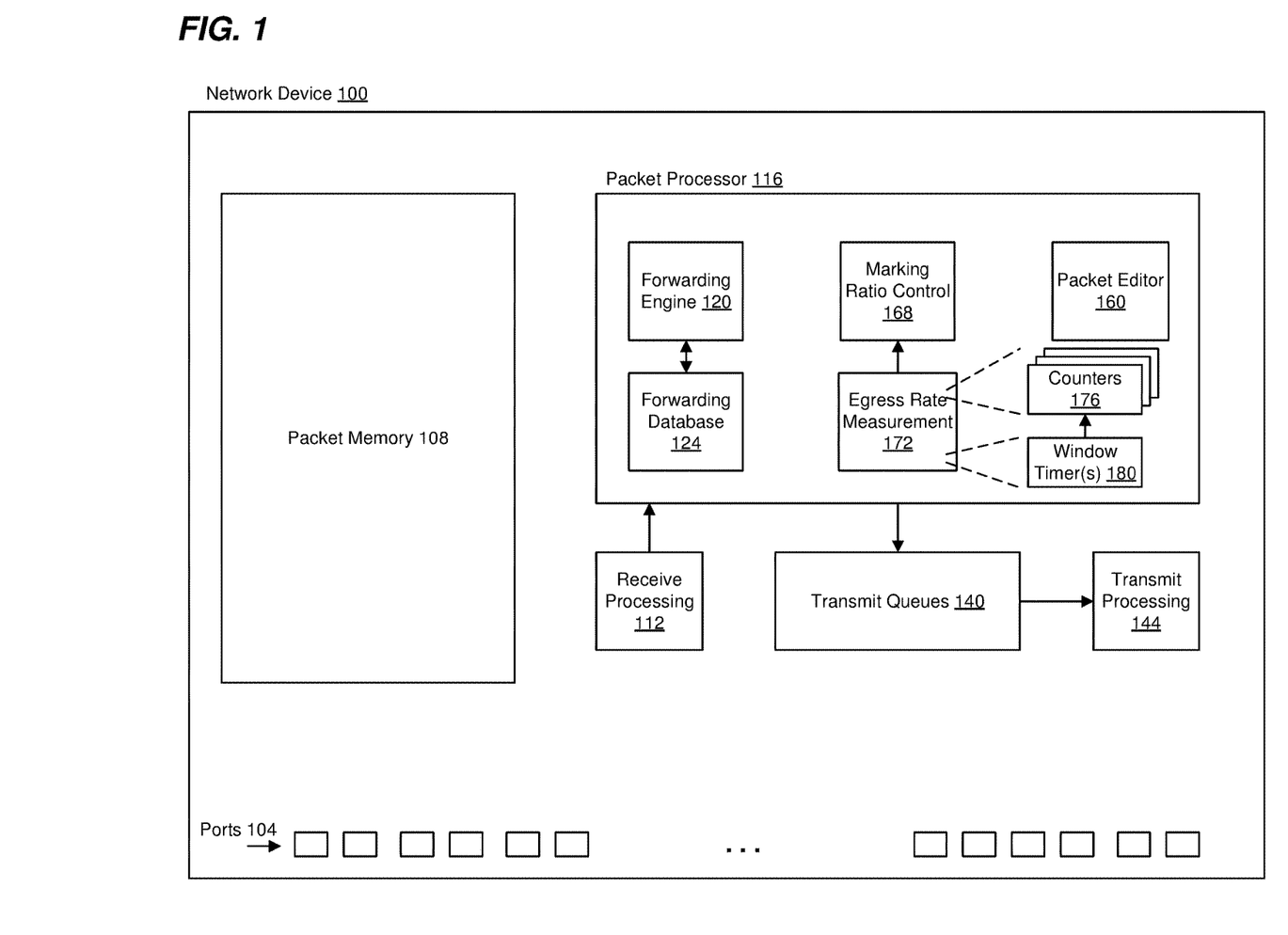
FIG. 1 is a simplified block diagram of an example network device configured to utilize packet marking to mitigate congestion, according to an embodiment.

FIG. 1 is a simplified block diagram of an example network device 100 configured to utilize packet marking to mitigate congestion, according to an embodiment. The network device 100 is a router, a switch, a bridge, virtual private network (VPN) concentrator, etc., in various embodiments. In some embodiments, the network device 100 includes at least layer-3 routing capability and/or layer-2 switching capability.

The network device 100 generally forwards packets between network links. The network device 100 includes a plurality of network interfaces 104, such as ports, trunks, etc., coupled to network links. Network interfaces, such as the network interfaces 104, are sometimes referred to herein as "ports" for ease of explanation. The network device 100 also includes a packet memory 108 that temporarily stores packets received by the network device 100 until the packets are transmitted via the ports 104.

The network device 100 includes receive processing circuitry 112 that is coupled to the ports 104 and the packet memory 108. The receive processing circuitry 112 is configured to store packets received via the ports 104 in the packet memory 108. The receive processing circuitry 112 is also configured to generate a packet descriptor for each received packet. The packet descriptor comprises metadata corresponding to the packet, such as information extracted from header(s) of the packet, a pointer to the packet in the memory 108, an identifier of the port 104 via which the packet was received, etc. In an embodiment, the receive processing circuitry 112 includes direct memory access (DMA) circuitry configured to store data corresponding to packets received via the ports 104 to the memory 108.

In some embodiments, headers of packets are stored in the packet descriptors in addition to, or instead of, storing the headers in the packet memory 108. Thus, the packet memory 108 does not store packet headers in some embodiments.

The network device 100 further includes a packet processor (or other suitable network processor) 116 that is coupled to the receive processing circuitry 112. The packet processor 116 is configured to received packet descriptors from the receive processing circuitry 112 and to process the packet descriptors to determine via which ports 104 corresponding packets are to be transmitted, among other things. For example, the packet processor 116 includes a forwarding engine 120 that is configured to make forwarding decisions for received packets based on network addresses (e.g., Internet Protocol (IP) addresses, media access control (MAC) addresses, or other suitable network addresses) or other suitable information (e.g., virtual private local area network (VLAN) information) stored in the corresponding packet descriptors. The forwarding engine 120 includes or is coupled to a forwarding database 124 that includes forwarding information, such as associations between packet header information (e.g., network addresses) and ports 104, which is used by forwarding engine 120 to determine via which port(s) 104 a packet is to be transmitted.

After the packet processor 116 determines that a packet is to be transmitted via a particular port 104, the packet processor stores the descriptor corresponding to the packet (or stores other suitable metadata corresponding to the packet) in a transmit queue 140 associated with the determined port 104. In an embodiment, each port 104 is associated with one or more respective transmit queues 140. In an embodiment, a respective set of multiple transmit queues 140 corresponds to each of at least some of the ports 104, where the multiple transmit queues 140 in the set correspond to different respective transmit priorities. In another embodiment, a single respective transmit queue 140 corresponds to each of at least some of the ports 104. The transmits queue(s) 104 corresponding to a port 104 are used for scheduling packets for transmission from the port 104.

Transmit processing circuitry 144 is coupled to the ports 104, the packet memory 108, and the transmit queues 140. The transmit processing circuitry 144 is configured to receive metadata regarding packets (e.g., pointers indicating locations in the packet memory 108 in which packets are stored) from the transmit queues 140, use the metadata to retrieve the packets from the memory 108, and provide the retrieved packets to the corresponding ports 104 for transmission. For example, the transmit processing circuitry 144 is configured to retrieve, from within the metadata received from a transmit queue 140, a pointer to a packet in the packet memory 108, and use the pointer to retrieve the packet from the packet memory 108, according to an embodiment. In an embodiment, the transmit processing circuitry 144 includes DMA circuitry configured to retrieve data corresponding to packets from the memory 108. In some embodiments in which headers of packets are stored in the packet descriptors, the transmit processing circuitry 144 provides a packet to a port for transmission by i) retrieving header information of the packet from a corresponding packet descriptor retrieved from a transmit queue 140, and ii) a body of the packet from the packet memory 108.

The packet processor 116 includes a packet editor 160 that is configured to modify headers of packets, under control of the packet processor 116, stored in the descriptors or in the packet memory 108. For example, the forwarding engine 120 determines a next hop address for a packet and instructs the packet editor 160 to modify a next hop address of a header of the packet in the descriptor or in the memory 108 accordingly, in an embodiment. As another example, the packet processor 116 determines that a tunneling header is to be removed from a packet that is to be egressed and instructs the packet editor 160 to remove the tunneling header from the header information in the descriptor or in the memory 108 before the packet is egressed, in an embodiment.

In an embodiment, when the packet processor 116 detects congestion corresponding to a port 104, the packet editor 160 is configured to mark packets that are to be transmitted via the port 104 to indicate that the packets have encountered congestion. For example, ECN specifies that the two least significant bits of a DiffServ field in an IP header of a packet are set to a particular value (e.g., a "Congestion Encountered" value) to indicate congestion, and the packet editor 160 is configured to ECN mark packets (e.g., set the two least significant bits of the DiffServ field in the IP header to the "Congestion Encountered" value) when instructed by the packet processor 116. If a conventional sense of "congestion" is defined as when a fill level of a queue or buffer exceeds a threshold, the packet editor 160 begins marking packets (e.g., "ECN marking"), at least in some embodiments and/or situations, before such "congestion" is encountered, as will be described in more detail below.

The packet processor 116 includes a marking ratio control unit 168 that is configured to determine, for packets that will be transmitted via a port 104 and/or transmit queue 140 that is experiencing congestion, a ratio of packets that are to be marked (e.g., ECN marked) to indicate congestion, according to an embodiment. In an embodiment, determining a ratio of the packets that are to be marked comprises determining a probability that any particular packet is to be marked. As an illustrative example, if the probability of marking any particular packet is determined to be 40%, four out of every ten packets will be marked on average. In another embodiment, determining a ratio of the packets that are to be marked comprises determining a fixed interval at which packets are to be marked. As an illustrative example, the marking ratio control unit 168 may determine that one of every four packets being egressed from a port 104 is to be marked, or one of every four packets corresponding to a particular transmit queue 140 being egressed from the port 104 is to be marked.

As will be described in more detail below, the marking ratio control unit 168 determines a marking ratio for a port 104 and/or transmit queue 140 based on a measured utilization of a network link corresponding to the port 104 and/or corresponding to a transmit queue 140, according to an embodiment. A rate at which data is provided to a port 104 for transmission (or transmitted from the port 104) is an example of a measure of a utilization of the network link, for example when the link capacity is known, according to an embodiment. Also, a rate at which data corresponding to a transmit queue 140 is provided to the port 104 for transmission (or transmitted from the port 104) is a measure of a utilization of the network link, for example when the link capacity is known and when a respective share of the link capacity corresponding to the transmit queue 140 is known.

An egress rate measurement unit 172 measures rates at which data is provided to respective ports 104 (or transmitted from the respective ports 104), and provides the measured rates to the marking ratio control unit 168. In some embodiments, the egress rate measurement unit 172 measures at least some rates per transmit queue 140. For example, the egress rate measurement unit 172 measures a rate at which data corresponding to a transmit queue 140 is provided to a port 104 for transmission (or transmitted from the port 104).

In an embodiment, the egress rate measurement unit 172 comprises a plurality of counters 176 and one or more window timers 180 that are used by the egress rate measurement unit 172 to measure respective rates at which data is provided to ports 104 (or transmitted from the ports 104). For example, a counter 176 counts an amount of data provided to a port 104 (or transmitted from the port 104) during a window of time (i.e., a time period) as measured by a window timer 180, and the egress rate measurement unit 172 calculates a rate as the value of the counter 176 divided by the length of the time period. As another example, a counter 176 counts an amount of data corresponding to a particular transmit queue 140 that is provided to a port 104 (or transmitted from the port 104) during a window of time (i.e., a time period) as measured by a window timer 180, and the egress rate measurement unit 172 calculates a rate as the value of the counter 176 divided by the length of the time period.

In some embodiments, a single window timer 180 is used in conjunction with multiple counters 176 to calculate multiple rates corresponding to multiple respective ports 104 and/or multiple respective transmit queues 140. In some embodiments, multiple window timers 180 are used in conjunction with multiple respective counters 176 to calculate multiple respective rates corresponding to multiple respective ports 104 and/or multiple respective transmit queues 140.

In some embodiments, the packet processor 116 comprises, or corresponds to, a hardware pipeline and some components of the packet processor 116 correspond to hardware stages or units in the pipeline. For example, the forwarding engine 120, the packet editor 160, and the marking ratio control unit 168 correspond to hardware stages or units in the pipeline, in an embodiment. In some embodiments in which the packet processor 116 to a hardware pipeline, at least a portions of the receive processing circuitry 112 and at least a portions of the transmit processing circuitry 144 are respective hardware states or units in the pipeline.

In some embodiments, the egress rate measurement unit 172 comprises hardware circuitry.

In some embodiments, at least some components of the packet processor 116 are implemented by a processor (or multiple processors, such as multiple run-to-completion processors) that executes machine readable instructions stored in one or more memories. For example, the forwarding engine 120, the packet editor 160, and the marking ratio control unit 168 correspond to software or firmware modules executed by processor(s).

In some embodiments, some of the components of the packet processor 116 are implemented using hardware circuitry, and other components of the packet processor 116 are implemented using a processor or processors that execute machine readable instructions stored in one or more memories.

In some embodiments, the packet memory 108, at least some of the receive processing circuitry 112, the packet processor 116, the transmit queues, and at least some of the transmit processor circuitry 144 are implemented on a single integrated circuit (IC) or as a system on a chip (SoC). In some such embodiments, the network device 100 optionally includes an additional packet memory (not shown) that is external to the single IC or SoC.

Figure 2:
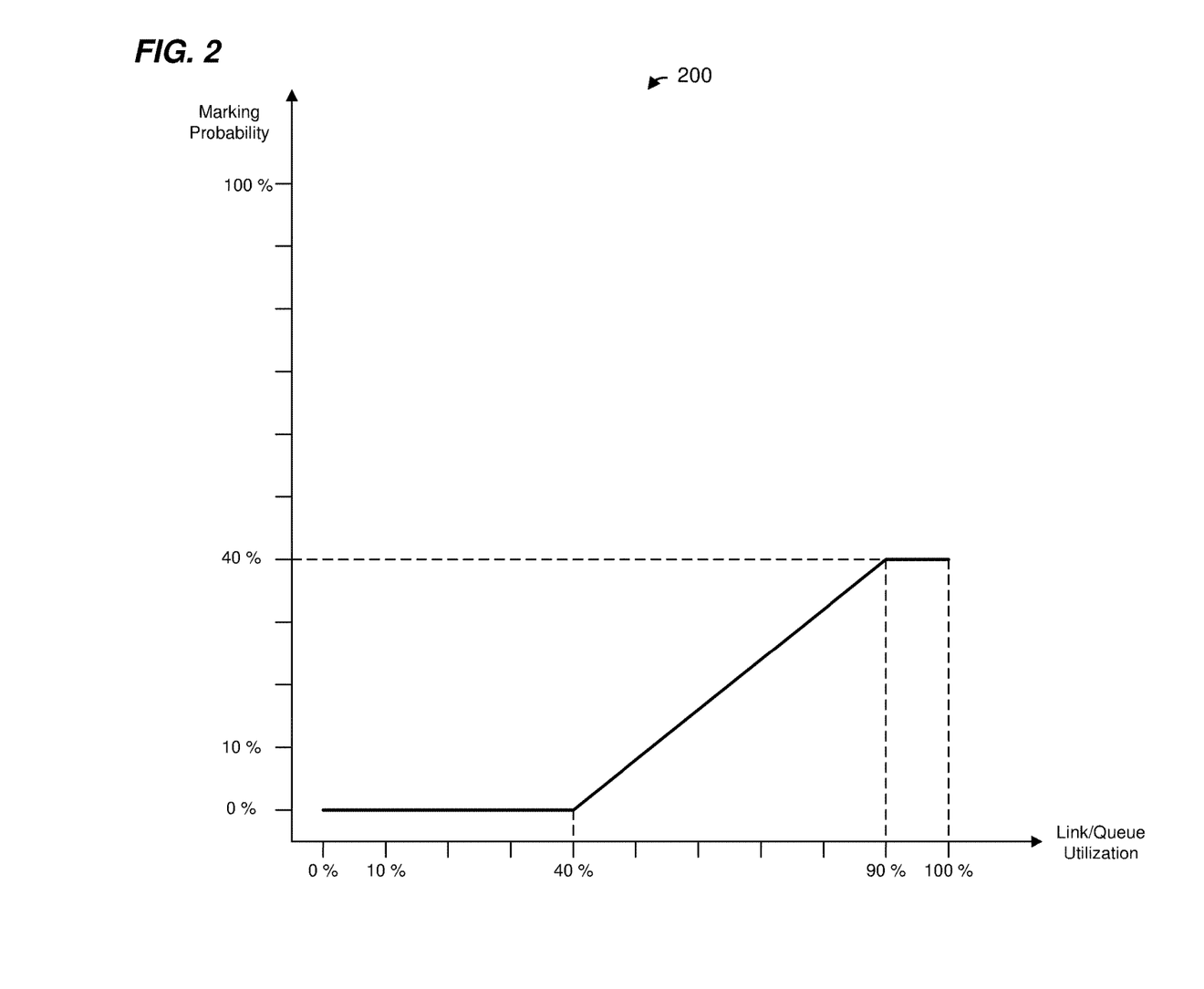
FIG. 2 is a diagram illustrating an example relationship between packet marking probability and link utilization (or utilization of a share of a network link corresponding to a transmit queue), where the network device of FIG. 1 marks packets according to the example relationship of FIG. 2, according to an embodiment.

FIG. 2 is a diagram 200 illustrating an example relationship between packet marking probability and link utilization (or utilization of a share of a network link corresponding to a transmit queue), according to an embodiment. FIG. 2 is described with reference to the network device 100 of FIG. 1 for ease of explanation. In some embodiments, however, the example relationship of FIG. 2 is used with another suitable network device. Similarly, the network device 100 uses another suitable relationship between packet marking probability and link utilization (or utilization of a share of a network link corresponding to a transmit queue), according to some embodiments.

In an embodiment, the marking ratio control unit 168 is configured to mark packets being transmitted via a port 104 according to the relationship illustrated in the diagram 200, or another suitable relationship. In the diagram 200, the horizontal axis corresponds to a measured utilization of a network link, or a measured utilization of a share of the network link corresponding to a transmit queue 140 ("link/queue utilization"). For example, in an embodiment in which multiple transmit queues 140 correspond to a single port 104 (e.g., the multiple transmit queues 140 correspond to respective priorities, respective guaranteed shares of the capacity of the network link coupled to the port 104, etc.), each of the multiple transmit queues 140 is generally accorded a particular share of the capacity of the network link coupled to the single port 104.

As discussed above, a rate at which data is provided to a port 104 for transmission (or transmitted from the port 104) is an example of a measure of a utilization of the network link, for example when the link capacity the network link is known, according to an embodiment. Also, a rate at which data corresponding to a transmit queue 140 is provided to the port 104 for transmission (or transmitted from the port 104) is a measured utilization of a share of the network link corresponding to the transmit queue 140, for example when the link capacity is known and when a share of the link capacity corresponding to the transmit queue 140 is known, according to an embodiment.

The vertical axis in the diagram 200 corresponds to a probability that a particular packet to be transmitted via the port 104 and/or transmit queue 140 is to be marked to indicate congestion.

In the example of FIG. 2, no marking occurs when the link/queue utilization is below 40%. For example, the marking ratio control unit 168 determines that no congestion is being experienced in connection with the network link and/or transmit queue when the link/queue utilization is below 40%, according to an embodiment.

When the link/queue utilization reaches 40%, the marking ratio control unit 168 instructs the packet editor 160 to mark packets with a probability that linearly increases from 0% to 40% as the link/queue utilization increases from 40% to 90%. When the link/queue utilization is between 90% and 100%, the marking ratio control unit 168 instructs the packet editor 160 to mark packets with a probability of 40%.

Although the diagram 200 illustrates a generally linear relationship between link/queue utilization and marking probability, other suitable relationships are used in other embodiments. For example, the relationship between link/queue utilization and marking probability may be generally parabolic, generally cubic, etc., or another suitable relationship. As another example, the marking ratio linearly increases when the link/queue utilization is between 90% and 100%.

Figure 3:
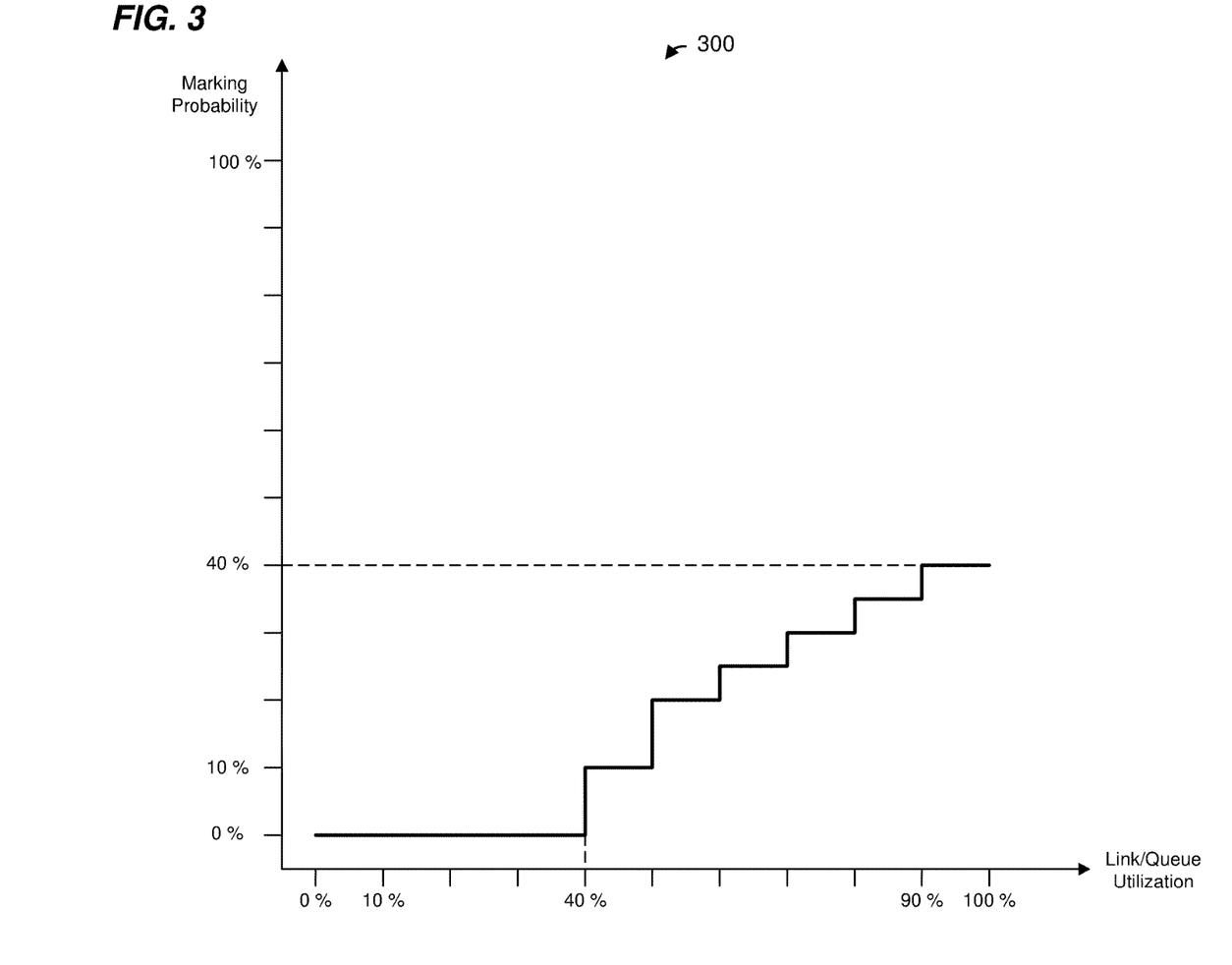
FIG. 3 is a diagram illustrating another example relationship between packet marking probability and link utilization (or utilization of a share of a network link corresponding to a transmit queue), where the network device of FIG. 1 marks packets according to the example relationship of FIG. 3, according to another embodiment.

FIG. 3 is a diagram 300 illustrating another example relationship between packet marking probability and link/queue utilization, according to an embodiment. FIG. 3 is described with reference to FIG. 1 for ease of explanation. In some embodiments, however, the example relationship is used with another suitable network device.

In the diagram 300, the relationship between link/queue utilization and marking probability is generally a stair step relationship. In the example of FIG. 3, no marking occurs when the link/queue utilization is below 40%. For example, the marking ratio control unit 168 determines that no congestion is being experienced in connection with the network link and/or transmit queue when the link/queue utilization is below 40%, according to an embodiment.

When the link/queue utilization is between 40% and 50%, the marking ratio control unit 168 instructs the packet editor 160 to mark packets with a probability of 10%. When the link/queue utilization is between 50% and 60%, the marking ratio control unit 168 instructs the packet editor 160 to mark packets with a probability of 20%. When the link/queue utilization is between 60% and 70%, the marking ratio control unit 168 instructs the packet editor 160 to mark packets with a probability of 25%. When the link/queue utilization is between 70% and 80%, the marking ratio control unit 168 instructs the packet editor 160 to mark packets with a probability of 30%. When the link/queue utilization is between 80% and 90%, the marking ratio control unit 168 instructs the packet editor 160 to mark packets with a probability of 35%. When the link/queue utilization is between 90% and 100%, the marking ratio control unit 168 instructs the packet editor 160 to mark packets with a probability of 40%.

The example relationships depicted in FIGS. 2 and 3 are merely illustrative examples, and other suitable relationships are utilized in other embodiments. For example, marking occurs before link/queue utilization reaches 40%, such as beginning at 35% link/queue utilization or another suitable percentage below 40%. As another example, marking does not occur until link/queue utilization is over 40%, such as beginning at 45% link/queue utilization or another suitable percentage above 40%. As yet another example, a maximum marking probability is higher than 40%, such as 45% or another suitable percentage above 40%. As yet another example, a maximum marking probability is less than 40%, such as 35% or another suitable percentage below 40%.

Additionally, although the example relationships depicted in FIGS. 2 and 3 are in the context of marking packets according to various marking probabilities, in other embodiments, relationships similar to those depicted in FIGS. 2 and 3 are in the context of marking packets according to various marking rates.

Figure 4:
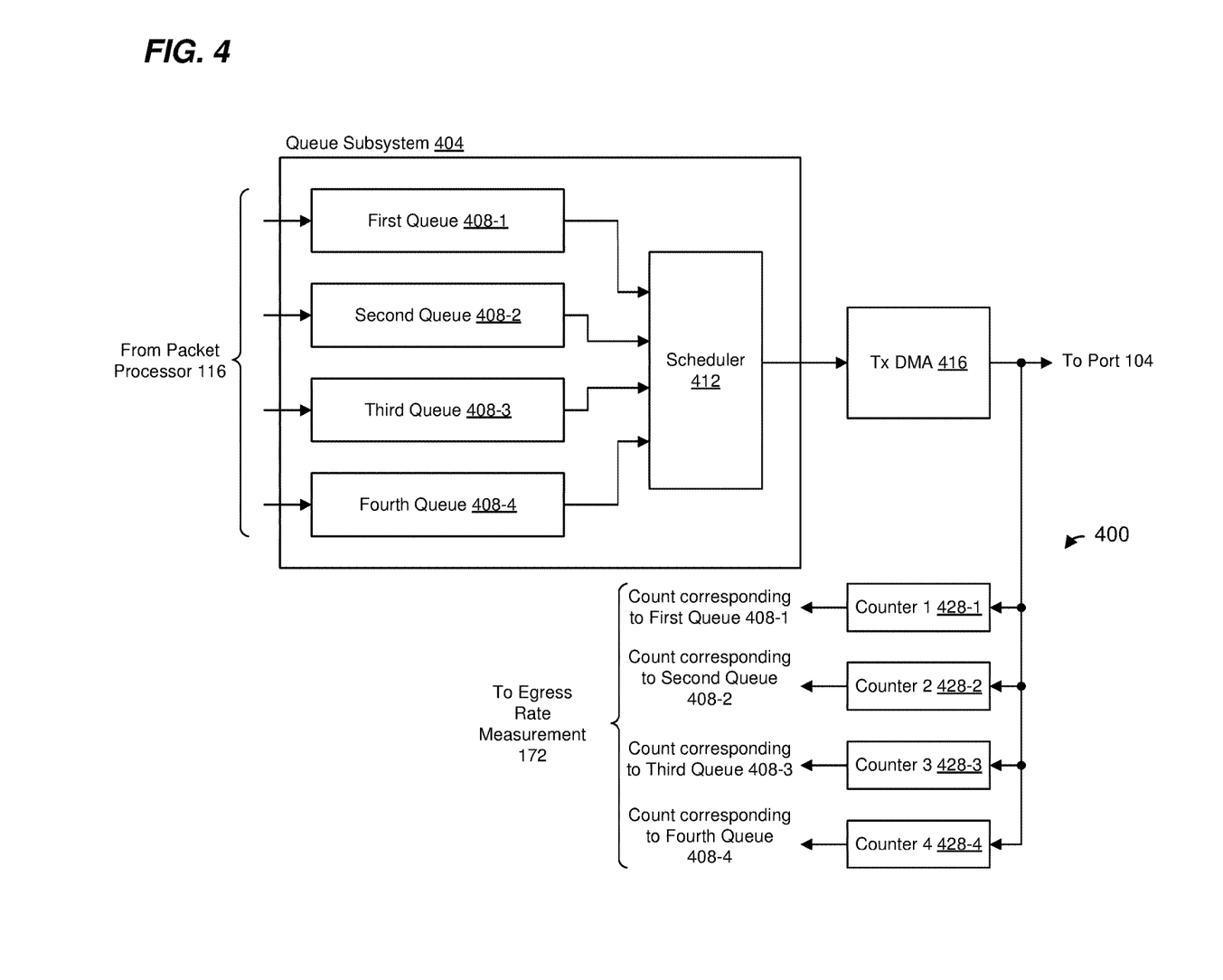
FIG. 4 is a simplified diagram of an example counting system, utilized by the network device of FIG. 1, for measuring respective amounts of data, corresponding to respective transmit queues, that are provided to a port during a time period, the respective measured amounts of data useful for determining a ratio at which to mark packets to indicate congestion, according to an embodiment.

FIG. 4 is a simplified diagram of an example counting system 400 for measuring respective amounts of data, corresponding to respective transmit queues, that are provided to a port 104 during a time period, according to an embodiment. FIG. 4 is described with reference to the network device 100 of FIG. 1 for ease of explanation. In some embodiments, however, the counting system 400 is included in another suitable network device.

The counting system 400 is associated with i) a port 104 and ii) a queue subsystem 404 corresponding to the port 104. The queue subsystem 404 includes a plurality of queues 408 that store packet descriptors (or other suitable metadata) corresponding to packets that are to be transmitted from the port 104. Although FIG. 4 depicts four queues 408, a suitable queue subsystem includes other suitable numbers of queues 408, such as one, two, three, five, six, seven, etc., according to various embodiments. In an embodiment, the queues 408 correspond to a subset of the transmit queues 140 of FIG. 1.

The packet descriptors stored in the queues 408 are received from the packet processor 116, and the queue subsystem 404 stores each packet descriptor in a selected queue 408, according to an embodiment. In an embodiment in which the different queues 408 correspond to different transmit priorities, a packet descriptor received from the packet processor 116 includes transmit priority information for the corresponding packet, and the queue subsystem 404 uses the transmit priority information to select one of the queues 408 in which to store the packet descriptor. In other embodiments, the queue subsystem 404 uses another suitable technique to select queues 408 packet in which descriptors are to be stored.

The packet descriptors include respective pointers to respective locations of corresponding packets stored in the packet memory 108, or other suitable information that indicates respective locations of corresponding packets stored in the packet memory 108, according to an embodiment.

Each queue 408 is a first-in-first-out (FIFO) queue, according to an embodiment. By storing packet descriptors in a queue 408, corresponding packets are scheduled for transmission and the packets (or at least payloads of the packets) remain stored in the packet memory 108 until the port 104 is ready to transmit the packets.

A scheduler circuit 412 retrieves packet descriptors from the queues 408 according to a suitable scheduling scheme, such as weighted round robin, and provides the retrieved packet descriptors (or a portion of each packet descriptor) to a transmit DMA circuit 416. When the transmit DMA circuit 416 receives a packet descriptor (or a portion thereof) from the scheduler circuit 412, the transmit DMA circuit 416 uses the information in the packet descriptor (e.g., the pointer) that indicates a location of the corresponding packet stored in the packet memory 108 to read the packet data from the packet memory 108 and provide the retrieved packet data to the port 104 for transmission. In embodiments in which the packet descriptors store headers of the packets to be transmitted, the transmit DMA circuit 416 (or another suitable circuit) provides headers the retrieved from the descriptors to the port 104 for transmission.

The counting system 400 includes respective counters 428 corresponding to respective queues 408. Each counter 428 counts packet data corresponding to the respective queue 408 that is provided to the port 104 by the transmit DMA circuit 416 during a time period (e.g., determined by a window timer 180), according to an embodiment. In an embodiment, the counters 428 are coupled to a window timer 180 (not shown in FIG. 4), which provides a control signal that is configured to reset the counters 428 at the beginning of the time period. In an embodiment, the window timer 180 also provides a control signal that is configured to prompt the counters 428 at the end of the time period to output respective count values to the egress rate measurement unit 172. In another embodiment, the window timer 180 provides to the egress rate measurement unit 172 a control signal that is configured to prompt the egress rate measurement unit 172 to retrieve the respective count values from the counters 428 at the end of the time period.

Count values such as the count values output by the counters 428 provide respective measures of link/queue utilization corresponding to the queues 408 (if the link capacity is known, the time period is known, and the share of the link capacity corresponding to the queue 408 is known), or can be used (e.g., by the egress rate measurement unit 172) to calculate respective measures of link/queue utilization corresponding to the queues 408, according to an embodiment. Additionally, count values such as the count values output by the counters 428 can be used (e.g., by the egress rate measurement unit 172) to calculate a measure of total link/queue utilization corresponding to the port by, among other things, adding the count values to calculate a total amount of data (e.g., from all of the queues 408) provided to the port 104 during the time period, according to an embodiment. The total amount of data provided to the port 104 during the time period provides a measure of link utilization corresponding to the port 104 (if the link capacity is known, and the time period is known), or can be used (e.g., by the egress rate measurement unit 172) to calculate a measure of link utilization corresponding to the port 104, according to an embodiment.

Figure 5:
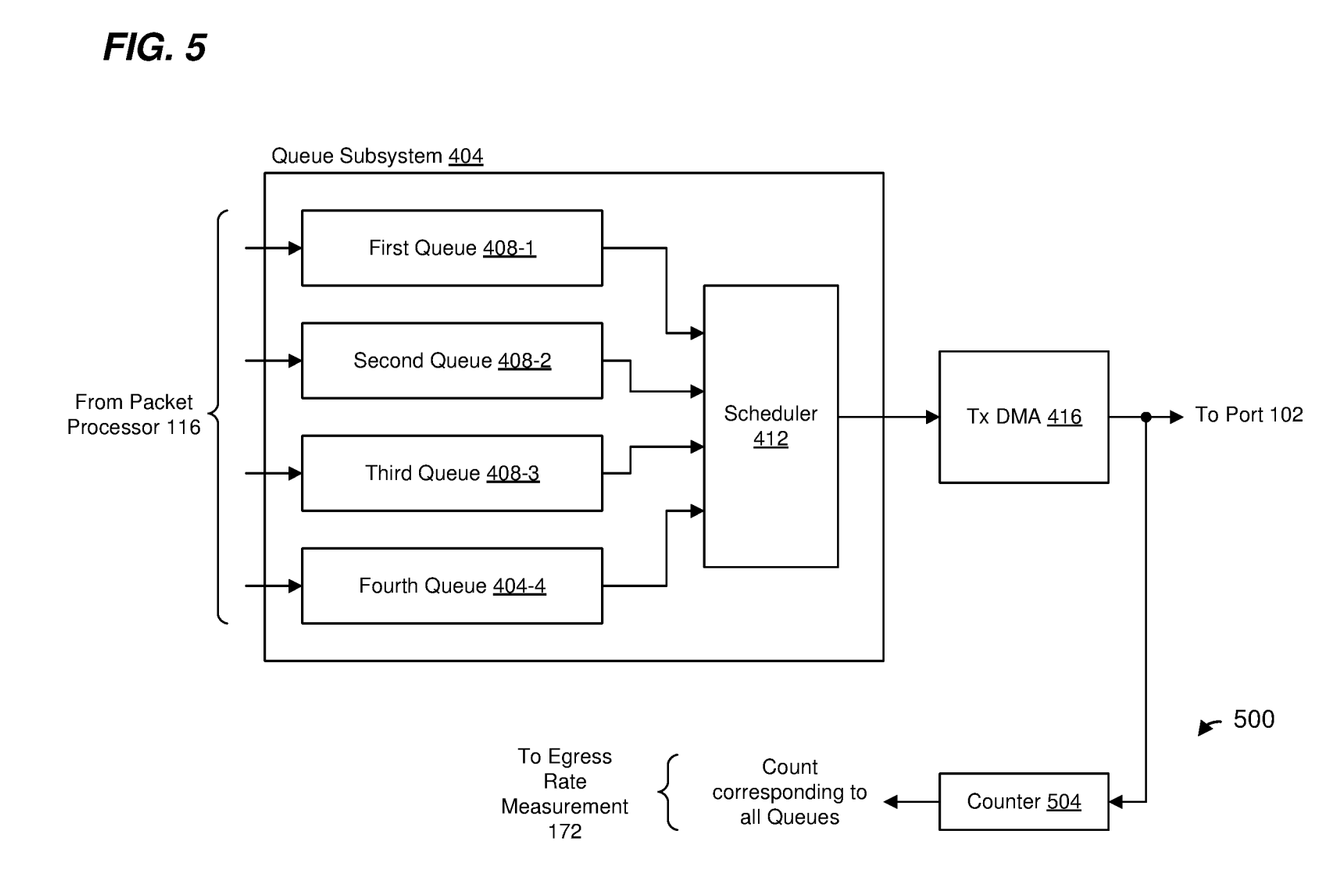
FIG. 5 is a simplified diagram of another example counting system, utilized by the network device of FIG. 1, for measuring respective amounts of data, corresponding to respective transmit queues, that are provided to a port during a time period, the respective measured amounts of data useful for determining a ratio at which to mark packets to indicate congestion, according to another embodiment.

FIG. 5 is a simplified diagram of another example counting system 500 for measuring an amount of data that are provided to a port 104 during a time period, according to an embodiment. FIG. 5 is described with reference to the network device 100 of FIG. 1 for ease of explanation. In some embodiments, however, the counting system 500 is included in another suitable network device.

Similar to the counting system 400 of FIG. 4, the counting system 500 is associated with a port 104 and the queue subsystem 404 corresponding to the port 104. The queue subsystem 404 and the transmit DMA circuit 416 operate in the same manner discussed above with reference to FIG. 4, and are not discussed again in detail for purposes of brevity. Although FIG. 5 depicts four queues 408, a suitable queue subsystem includes other suitable numbers of queues 408, such as one, two, three, five, six, seven, etc., according to various embodiments.

The counting system 500 includes a counter 504 that counts packet data that is provided to the port 104 by the transmit DMA circuit 416 during a time period (e.g., determined by a window timer 180), according to an embodiment. In an embodiment, the counter 504 is coupled to a window timer 180 (not shown in FIG. 5), which provides a control signal that is configured to reset the counter 504 at the beginning of the time period. In an embodiment, the window timer 180 also provides a control signal that is configured to prompt the counter 504 at the end of the time period to output a count values to the egress rate measurement unit 172. In another embodiment, the window timer 180 provides to the egress rate measurement unit 172 a control signal that is configured to prompt the egress rate measurement unit 172 to retrieve the count value from the counter 504 at the end of the time period.

As discussed above, a count value such as the count value output by the counter 504 provides a measure of link utilization corresponding to the port 104, or can be used (e.g., by the egress rate measurement unit 172) to calculate a measure of link utilization corresponding to the port, according to an embodiment.

Figure 6:
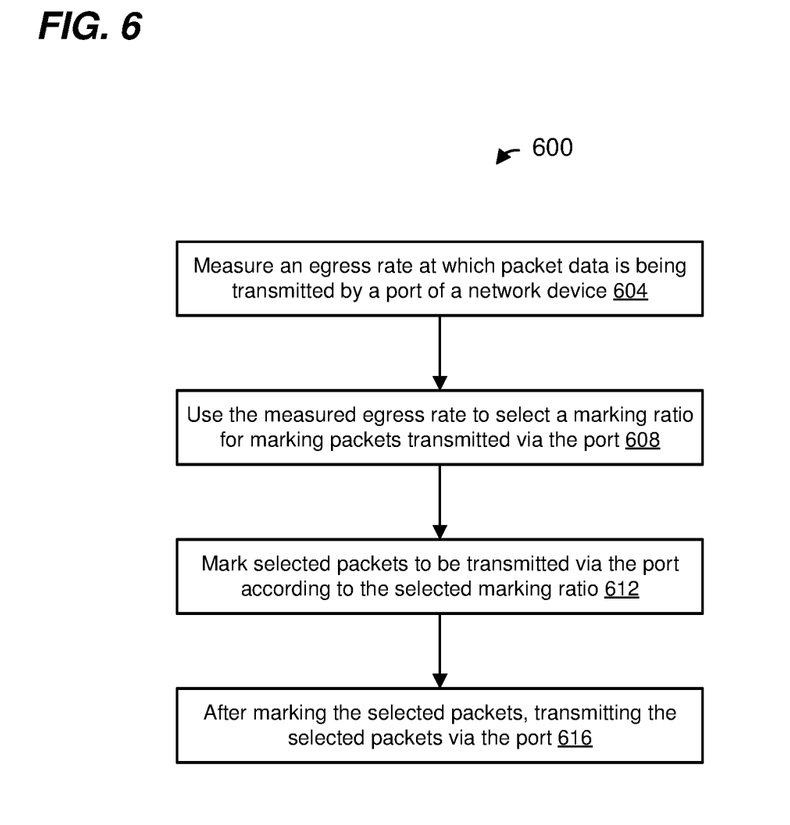
FIG. 6 is a flow diagram of an example method, implemented by the network device of FIG. 1, for signaling congestion in a network, according to an embodiment.

FIG. 6 is a flow diagram of an example method 600 for signaling congestion in a network, according to an embodiment. The method 600 is implemented by the network device 100, in an embodiment, and the method 600 is described with reference to FIGS. 1-5 for ease of explanation. In various other embodiments, however, the method 600 is implemented by a suitable network device different than the network device 100, utilizes a suitable relationship between packet marking ratio and link/queue utilization different than the relationships illustrated in FIGS. 2 and 3, and/or uses a suitable counting system and/or queue subsystem different than the counting systems and queue subsystems illustrated in FIGS. 4 and 5.

At block 604, the network device measures (e.g., the egress rate measurement unit 172 measures) an egress rate at which data is being transmitted via a port of the network device. In an embodiment, measuring the egress rate comprises counting an amount of packet data transmitted via the port during a time period having a defined length of time. In an embodiment, measuring the egress rate further comprises dividing the amount of packet data transmitted via the port during the time period by the defined length of time.

In an embodiment, a measure of the egress rate comprises a count of packet data transmitted via the port during a time period having a defined length of time. In an embodiment, a measure of the egress rate comprises a count of packet data transmitted via the port during a time period divided by a length of time of the time period.

At block 608, the network device uses (e.g., the marking ratio control unit 168 uses) the measured egress rate to select a marking ratio for marking packets to be transmitted via the port. In an embodiment, the marking of packets indicates that a network path via which the marked packets travelled experienced congestion, and packets marked at different marking ratios indicate different levels of congestion. In an embodiment, different marking ratios that can be selected at block 608 correspond to different measured egress rates.

In an embodiment, selecting the marking ratio comprises selecting a probability according to which packets to be transmitted via the port are to be marked. In another embodiment, selecting the marking ratio comprises selecting an interval according to which packets to be transmitted via the port are to be marked.

At block 612, the network device marks (e.g., the packet editor 160 marks) selected packets according to the marking ratio selected at block 608. In an embodiment in which the marking ratio selected at block 608 comprises a marking probability, marking the selected packets at block 612 comprises marking packets according to the selected marking probability. In another embodiment in which the marking ratio selected at block 608 comprises a marking interval, marking the selected packets at block 612 comprises marking packets according to the selected marking interval.

At block 616, after marking the selected packets at block 612, the network device transmits the selected packets via the port. In an embodiment, the marking of packets signals that a network path via which the marked packets travelled experienced congestion, and packets marked at different marking ratios indicate different levels of congestion.

In an embodiment, measuring the egress rate at block 604 comprises measuring a rate at which data corresponding to a transmit queue is transmitted via the port; and using the measured egress rate to select the marking ratio at block 608 comprises using the rate at which data corresponding to the queue is transmitted to select the marking ratio.

In an embodiment, method 600 further comprises: scheduling first packets for transmission via the port by storing information corresponding to the first packets in a first queue corresponding to the port; scheduling second packets for transmission via the port by storing information corresponding to the second packets in a second queue corresponding to the port; and selecting first packets and second packets for transmission via the port by retrieving information from the first queue and the second queue according to a scheduling scheme. In an embodiment, measuring the egress rate at block 604 comprises: measuring a first rate at which data corresponding to the first queue is transmitted via the port; measuring a second rate at which data corresponding to the second queue is transmitted via the port; and determining the egress rate using the first rate and the second rate.

Embodiment 1: A network device, comprising: a forwarding database; a forwarding engine coupled to the forwarding database, the forwarding engine being configured to forward packets to ports for transmission, the ports being determined by the forwarding engine using forwarding information residing in the forwarding database; a rate measurement circuit that is configured to measure respective egress rates at which respective data is being transmitted via respective ports; a marking ratio determination circuit configured to select respective marking ratios based on respective measured egress rates, the marking ratios for marking packets to be transmitted via the respective ports to indicate respective levels of congestion corresponding to the respective ports, wherein different marking ratios correspond to different measured egress rates; and a packet editor circuit configured to mark selected packets to be transmitted via respective ports according to the respective selected marking ratios, wherein the respective selected marking ratios indicate to other communication devices that respective network paths via which the selected packets travelled experienced congestion, and the respective marking ratios indicate respective levels of congestion.

Embodiment 2: The network device of embodiment 1, further comprising: respective queues corresponding to respective ports, the respective queues for scheduling packets for transmission via the respective ports; wherein the rate measurement circuit is configured to measure respective rates at which respective data corresponding to the respective queues are being transmitted via the respective ports; and wherein the marking ratio determination circuit is configured to use the respective rates at which the respective data corresponding to the respective queues are being transmitted to select respective marking ratios for marking packets corresponding to the respective queues.

Embodiment 3: The network device of embodiment 2, wherein: the respective queues include a first queue corresponding to a first port and a second queue corresponding to the first port, the first queue being configured for scheduling first packets for transmission via the first port, and the second queue being configured for scheduling second packets for transmission via the first port; and the network device further comprises a scheduling circuit corresponding to the first port, the scheduling circuit being configured to select first packets and second packets for transmission via the port by retrieving information from the first queue and the second queue according to a scheduling scheme.

Embodiment 4: The network device of embodiment 3, wherein: the rate measurement circuit is configured to: measure a first rate at which data corresponding to the first queue is transmitted via the first port, measure a second rate at which data corresponding to the second queue is transmitted via the first port, and determine a first egress rate using the first rate and the second rate; and the marking ratio determination circuit is configured to select a first marking ratio based on the first egress rate, the first marking ratios for marking packets to be transmitted via the first port to indicate a level of congestion corresponding to the first port.

Embodiment 5: The network device of any of embodiments 14, wherein the rate measurement circuit comprises: respective counters configured to count respective amounts of respective data that are transmitted via respective ports during respective time periods.

Embodiment 6: The network device of embodiment 5, wherein the rate measurement circuit is configured to: determine the respective egress rates using i) the respective amounts of respective data that are transmitted, and ii) respective lengths of the respective time periods.

Embodiment 7: The network device of any of embodiments 1-6, wherein: the marking ratio determination circuit is configured to use the respective measured egress rates to select respective marking probabilities for marking respective packets to be transmitted via respective ports, wherein different marking probabilities correspond to different measured egress rates; and the packet editor circuit is configured to mark the selected packets to be transmitted via respective ports according to the selected respective marking probabilities.

Embodiment 8: The network device of any of embodiments 1-6, wherein: the marking ratio determination circuit is configured to use the respective measured egress rates to select respective marking intervals for marking respective packets to be transmitted via respective ports, wherein different marking intervals correspond to different measured egress rates; and the packet editor circuit is configured to mark the selected packets to be transmitted via respective ports according to the selected respective marking intervals.

Embodiment 9: The network device of any of embodiments 1-8, wherein the marking ratio determination circuit is configured to determine that no packets to be transmitted via a first port are to be marked when a measured egress rate corresponding to the first port is below a threshold.

Embodiment 10: A method for signaling congestion in a network, comprising: measuring, at a network device, an egress rate at which data is being transmitted via a port of the network device; selecting, at the network device, a marking ratio for marking packets to be transmitted via the port based on the measured egress rate to indicate a level of congestion corresponding to the port, wherein different marking ratios correspond to different measured egress rates; marking, at the network device, selected packets according to the selected marking ratio; and after marking the selected packets that are to be transmitted via the port, transmitting the selected packets via the port, wherein the marking of the selected packets signals that a network path via which the selected packets travelled experienced congestion and the marking ratio indicates a level of the congestion.

Embodiment 11: The method of embodiment 10, wherein: measuring the egress rate comprises measuring a rate at which data corresponding to a queue is transmitted via the port, the queue for scheduling the packets for transmission via the port; and selecting the marking ratio comprising using the rate at which data corresponding to the queue is transmitted to select the marking ratio for marking packets corresponding to the queue to be transmitted.

Embodiment 12: The method of embodiment 11, wherein: the packets are first packets; the queue is a first queue for scheduling the first packets for transmission via the port; and the method further comprises: scheduling second packets for transmission via the port by storing information corresponding to the second packets in a second queue corresponding to the port, and selecting first packets and second packets for transmission via the port by retrieving information from the first queue and the second queue according to a scheduling scheme.

Embodiment 13: The method of embodiment 12, wherein: measuring the egress rate comprises: measuring a first rate at which data corresponding to the first queue is transmitted via the port, measuring a second rate at which data corresponding to the second queue is transmitted via the port, and determining the egress rate using the first rate and the second rate; and selecting the marking ratio comprises selecting the marking ratio using the egress rate determined using the first rate and the second rate.

Embodiment 14: The method of any of embodiments 10-13, wherein measuring the egress rate comprises: counting, at the network device, an amount of the data that is transmitted via the port during a time period.

Embodiment 15: The method of embodiment 14, wherein measuring the egress rate further comprises: determining, at the network device, the egress rate using i) the amount of the data that is transmitted via the port during the time period, and ii) a length of the time period.

Embodiment 16: The method of any of embodiments 10-15, wherein: selecting the marking ratio for marking packets comprises using the measured egress rate to select a marking probability for marking packets to be transmitted via the port, wherein different marking probabilities correspond to different measured egress rates; and marking the selected packets according to the selected marking ratio comprises marking the selected packets according to the selected marking probability.

Embodiment 17: The method of any of embodiments 10-15, wherein: selecting the marking ratio for marking packets comprises using the measured egress rate to select a marking interval for marking packets to be transmitted via the port, wherein different marking intervals correspond to different measured egress rates; and marking the selected packets according to the selected marking ratio comprises marking the selected packets according to the selected marking interval.

Embodiment 18: The method of any of embodiments 10-17, further comprising: determining, at the network device, that no packets to be transmitted via the port are to be marked when the measured egress rate is below a threshold.

Embodiment 19: The method of any of embodiments 10-17, further comprising: determining, at the network device, that no packets corresponding to a particular transmit queue that are to be transmitted via the port are to be marked when the measured egress rate is below a threshold.

At least some of the various blocks, operations, and techniques described above may be implemented utilizing hardware, a processor executing firmware instructions, a processor executing software instructions, or any combination thereof. When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions are stored in a memory device(s) such as a random access memory (RAM), a read only memory (ROM), a Flash memory, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
   a forwarding database;
   a forwarding engine coupled to the forwarding database, the forwarding engine being configured to forward packets to ports for transmission, the ports being determined by the forwarding engine using forwarding information residing in the forwarding database;
   a rate measurement circuit that is configured to measure respective egress rates at which respective data is being transmitted via respective ports;
   a marking ratio determination circuit configured to select respective marking ratios based on respective measured egress rates, the marking ratios for marking packets to be transmitted via the respective ports to indicate respective levels of congestion corresponding to the respective ports, wherein different marking ratios correspond to different measured egress rates; and a packet editor circuit configured to mark selected packets to be transmitted via respective ports, wherein the packets to be marked are selected according to the respective selected marking ratios, and wherein the respective selected marking ratios indicate to other communication devices that respective network paths via which the selected packets travelled experienced congestion, and the respective marking ratios indicate respective levels of congestion.

2. The network device of claim 1, further comprising:
respective queues corresponding to respective ports, the respective queues for scheduling packets for transmission via the respective ports;
wherein the rate measurement circuit is configured to measure respective rates at which respective data corresponding to the respective queues are being transmitted via the respective ports; and
wherein the marking ratio determination circuit is configured to use the respective rates at which the respective data corresponding to the respective queues are being transmitted to select respective marking ratios for marking packets corresponding to the respective queues.

3. The network device of claim 2, wherein:
the respective queues include a first queue corresponding to a first port and a second queue corresponding to the first port, the first queue being configured for scheduling first packets for transmission via the first port, and the second queue being configured for scheduling second packets for transmission via the first port; and
the network device further comprises a scheduling circuit corresponding to the first port, the scheduling circuit being configured to select first packets and second packets for transmission via the port by retrieving information from the first queue and the second queue according to a scheduling scheme.

4. The network device of claim 3, wherein:
the rate measurement circuit is configured to:
measure a first rate at which data corresponding to the first queue is transmitted via the first port,
measure a second rate at which data corresponding to the second queue is transmitted via the first port, and
determine a first egress rate using the first rate and the second rate; and
the marking ratio determination circuit is configured to select a first marking ratio based on the first egress rate, the first marking ratios for marking packets to be transmitted via the first port to indicate a level of congestion corresponding to the first port.

5. The network device of claim 1, wherein the rate measurement circuit comprises:
respective counters configured to count respective amounts of respective data that are transmitted via respective ports during respective time periods.

6. The network device of claim 5, wherein the rate measurement circuit is configured to:
determine the respective egress rates using i) the respective amounts of respective data that are transmitted, and ii) respective lengths of the respective time periods.

7. The network device of claim 1, wherein:
the marking ratio determination circuit is configured to use the respective measured egress rates to select respective marking probabilities for marking respective packets to be transmitted via respective ports, wherein different marking probabilities correspond to different measured egress rates; and
the packet editor circuit is configured to mark the selected packets to be transmitted via respective ports according to the selected respective marking probabilities.

8. The network device of claim 1, wherein:
the marking ratio determination circuit is configured to use the respective measured egress rates to select respective marking intervals for marking respective packets to be transmitted via respective ports, wherein different marking intervals correspond to different measured egress rates; and
the packet editor circuit is configured to mark the selected packets to be transmitted via respective ports according to the selected respective marking intervals.

9. The network device of claim 1, wherein the marking ratio determination circuit is configured to determine that no packets to be transmitted via a first port are to be marked when a measured egress rate corresponding to the first port is below a threshold.

10. A method for signaling congestion in a network, the method comprising:
measuring, at a network device, an egress rate at which data is being transmitted via a port of the network device;
selecting, at the network device, a marking ratio for marking packets to be transmitted via the port based on the measured egress rate to indicate a level of congestion corresponding to the port, wherein different marking ratios correspond to different measured egress rates;
marking, at the network device, selected packets to be transmitted via the port, wherein the packets to be marked are selected according to the selected marking ratio; and
after marking the selected packets that are to be transmitted via the port, transmitting the selected packets via the port, wherein the marking of the selected packets signals that a network path via which the selected packets travelled experienced congestion and the marking ratio indicates a level of the congestion.

11. The method of claim 10, wherein:
measuring the egress rate comprises measuring a rate at which data corresponding to a queue is transmitted via the port, the queue for scheduling the packets for transmission via the port; and
selecting the marking ratio comprising using the rate at which data corresponding to the queue is transmitted to select the marking ratio for marking packets corresponding to the queue to be transmitted.

12. The method of claim 11, wherein:
the packets are first packets;
the queue is a first queue for scheduling the first packets for transmission via the port; and
the method further comprises:
scheduling second packets for transmission via the port by storing information corresponding to the second packets in a second queue corresponding to the port, and
selecting first packets and second packets for transmission via the port by retrieving information from the first queue and the second queue according to a scheduling scheme.

13. The method of claim 12, wherein:
measuring the egress rate comprises:
measuring a first rate at which data corresponding to the first queue is transmitted via the port, measuring a second rate at which data corresponding to the second queue is transmitted via the port, and determining the egress rate using the first rate and the second rate; and selecting the marking ratio comprises selecting the marking ratio using the egress rate determined using the first rate and the second rate.

14. The method of claim 10, wherein measuring the egress rate comprises:

counting, at the network device, an amount of the data that is transmitted via the port during a time period.

15. The method of claim 14, wherein measuring the egress rate further comprises:

determining, at the network device, the egress rate using i) the amount of the data that is transmitted via the port during the time period, and ii) a length of the time period.

16. The method of claim 10, wherein:

selecting the marking ratio for marking packets comprises using the measured egress rate to select a marking probability for marking packets to be transmitted via the port, wherein different marking probabilities correspond to different measured egress rates; and marking the selected packets according to the selected marking ratio comprises marking the selected packets according to the selected marking probability.

17. The method of claim 10, wherein:

selecting the marking ratio for marking packets comprises using the measured egress rate to select a marking interval for marking packets to be transmitted via the port, wherein different marking intervals correspond to different measured egress rates; and marking the selected packets according to the selected marking ratio comprises marking the selected packets according to the selected marking interval.

18. The method of claim 10, further comprising:

determining, at the network device, that no packets to be transmitted via the port are to be marked when the measured egress rate is below a threshold.

19. The method of claim 10, further comprising:

determining, at the network device, that no packets corresponding to a particular transmit queue that are to be transmitted via the port are to be marked when the measured egress rate is below a threshold.

* * * * *